(12) United States Patent
Hintzer et al.

(10) Patent No.: US 7,728,087 B2
(45) Date of Patent: Jun. 1, 2010

(54) FLUOROPOLYMER DISPERSION AND METHOD FOR MAKING THE SAME

(75) Inventors: Klaus Hintzer, Kastl (DE); Harald Kaspar, Burgkirchen (DE); Helmut Traunspurger, Julbach (DE); Tilman Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 491 days.

(21) Appl. No.: 11/275,331

(22) Filed: Dec. 23, 2005

(65) Prior Publication Data

US 2007/0149695 A1    Jun. 28, 2007

(51) Int. Cl.
*C08F 2/10* (2006.01)
(52) U.S. Cl. ............... 526/200; 526/242; 526/248; 526/250; 524/155; 523/160
(58) Field of Classification Search ........... 526/200, 526/242, 248, 250; 524/155; 523/160
See application file for complete search history.

(56) References Cited

U.S. PATENT DOCUMENTS

| | | | |
|---|---|---|---|
| 2,713,593 A | 7/1955 | Brice et al. |
| 3,037,953 A | 6/1962 | Marks et al. |
| 3,142,665 A | 7/1964 | Cardinal et al. |
| 3,179,614 A | 4/1965 | Edwards |
| 3,260,691 A | 7/1966 | Lavin et al. |
| 3,271,341 A | 9/1966 | Garrison |
| 3,315,201 A | 4/1967 | Werme |
| 3,391,099 A | 7/1968 | Punderson |
| 3,451,908 A | 6/1969 | Sianesi et al. |
| 3,489,595 A | 1/1970 | Brown, Jr. |
| 3,555,100 A | 1/1971 | Garth et al. |
| 3,635,926 A | 1/1972 | Gresham |
| 3,642,742 A | 2/1972 | Carlson |
| 3,721,696 A | 3/1973 | Sianesi et al. |
| 3,790,403 A | 2/1974 | Ribbans, III |
| 3,855,191 A | 12/1974 | Doughty, Jr. et al. |
| 3,882,153 A | 5/1975 | Seki et al. |
| 3,981,945 A | 9/1976 | Attwood et al. |
| 4,016,345 A | 4/1977 | Holmes |
| 4,025,709 A | 5/1977 | Blaise et al. |
| 4,049,863 A | 9/1977 | Vassiliou |
| 4,123,401 A | 10/1978 | Berghmans et al. |
| 4,131,711 A | 12/1978 | Attwood |
| 4,252,859 A | 2/1981 | Concannon et al. |
| 4,262,101 A | 4/1981 | Hartwimmer et al. |
| 4,282,162 A | 8/1981 | Kuhls |
| 4,287,112 A | 9/1981 | Berghmans |
| 4,353,950 A | 10/1982 | Vassiliou |
| 4,369,266 A | 1/1983 | Kuhls et al. |
| 4,380,618 A | 4/1983 | Khan et al. |
| 4,381,384 A | 4/1983 | Khan |
| 4,391,940 A | 7/1983 | Kuhls et al. |
| 4,425,448 A | 1/1984 | Concannon et al. |
| 4,439,385 A | 3/1984 | Kuhls et al. |
| 4,544,458 A | 10/1985 | Grot et al. |
| 4,548,986 A | 10/1985 | Suzuki et al. |
| 4,588,796 A | 5/1986 | Wheland |
| 4,618,641 A | 10/1986 | Hengel |
| 4,621,116 A | 11/1986 | Morgan |
| 4,766,190 A | 8/1988 | Morita et al. |
| 4,789,717 A | 12/1988 | Giannetti et al. |
| 4,861,845 A | 8/1989 | Slocum et al. |
| 4,864,006 A | 9/1989 | Giannetti et al. |
| 4,987,254 A | 1/1991 | Schwertfeger et al. |
| 5,153,322 A | 10/1992 | Flynn |
| 5,160,791 A | 11/1992 | Tannenbaum |
| 5,168,107 A | 12/1992 | Tannenbaum |
| 5,198,491 A | 3/1993 | Honda et al. |
| 5,219,910 A | 6/1993 | Stahl et al. |
| 5,223,343 A | 6/1993 | Tannenbaum |
| 5,229,480 A | 7/1993 | Uschold |
| 5,230,961 A | 7/1993 | Tannenbaum |
| 5,272,186 A | 12/1993 | Jones |
| 5,285,002 A | 2/1994 | Grootaert |
| 5,312,935 A | 5/1994 | Mayer et al. |
| 5,442,097 A | 8/1995 | Obermeier et al. |
| 5,447,982 A | 9/1995 | Kamba et al. |
| 5,453,477 A | 9/1995 | Oxenrider et al. |
| 5,463,021 A | 10/1995 | Beyer et al. |
| 5,478,651 A | 12/1995 | Tannenbaum |
| 5,488,142 A | 1/1996 | Fall et al. |
| 5,498,680 A | 3/1996 | Abusleme et al. |
| 5,530,078 A | 6/1996 | Felix et al. |
| 5,532,310 A | 7/1996 | Grenfell et al. |
| 5,562,991 A | 10/1996 | Tannenbaum |
| 5,576,381 A | 11/1996 | Bladel et al. |
| 5,591,877 A | 1/1997 | Obermeier et al. |
| 5,608,022 A | 3/1997 | Nakayama et al. |
| 5,656,201 A | 8/1997 | Vicsa et al. |
| 5,663,255 A | 9/1997 | Anolick et al. |
| 5,667,846 A | 9/1997 | Thomas |
| 5,688,884 A | 11/1997 | Baker et al. |
| 5,700,859 A | 12/1997 | Ogura et al. |
| 5,710,345 A | 1/1998 | Navarrini et al. |

(Continued)

FOREIGN PATENT DOCUMENTS

CA         2354138         6/2000

(Continued)

OTHER PUBLICATIONS

"Guide to Protein Purification, Methods in Enzymology," Deutscher, M. vol. 182, 24. 1990, (pp. 309-317).

(Continued)

*Primary Examiner*—Peter D. Mulcahy
*Assistant Examiner*—Henry Hu
(74) *Attorney, Agent, or Firm*—Julie A. Lapos-Kuchar; Brian E. Szymanski

(57) ABSTRACT

A method for polymerizing, in an aqueous medium, at least one fluorinated monomer in the presence of a non-copolymerizable, non-fluorinated surfactant. The surfactant is generally selected from a non-ionic surfactant, a primary anionic surfactant, or a combination thereof. Fluorinated surfactants are not utilized. The resulting partially fluorinated polymer in the aqueous medium is either a semi-crystalline polymer or a crystalline polymer.

9 Claims, No Drawings

U.S. PATENT DOCUMENTS

| | | | |
|---|---|---|---|
| 5,721,053 A | 2/1998 | Thomas | |
| 5,763,552 A | 6/1998 | Feiring et al. | |
| 5,789,083 A | 8/1998 | Thomas | |
| 5,789,508 A | 8/1998 | Baker et al. | |
| 5,804,650 A | 9/1998 | Tsuda et al. | |
| 5,895,799 A | 4/1999 | Wu et al. | |
| 5,955,556 A | 9/1999 | McCarthy et al. | |
| 5,959,026 A | 9/1999 | Abusleme et al. | |
| 5,969,063 A * | 10/1999 | Parker et al. | 526/200 |
| 5,990,330 A | 11/1999 | Sulzbach et al. | |
| 6,013,795 A | 1/2000 | Manzara et al. | |
| 6,025,307 A | 2/2000 | Chittofrati et al. | |
| 6,103,843 A | 8/2000 | Abusleme et al. | |
| 6,103,844 A | 8/2000 | Brothers | |
| 6,126,849 A | 10/2000 | Yamana et al. | |
| 6,136,893 A | 10/2000 | Yamashita et al. | |
| 6,153,688 A | 11/2000 | Miura et al. | |
| 6,218,464 B1 * | 4/2001 | Parker et al. | 524/805 |
| 6,245,923 B1 | 6/2001 | Sulzbach et al. | |
| 6,255,384 B1 | 7/2001 | McCarthy et al. | |
| 6,255,536 B1 | 7/2001 | Worm et al. | |
| 6,267,865 B1 | 7/2001 | Polson et al. | |
| 6,365,684 B1 | 4/2002 | McCarthy et al. | |
| 6,391,182 B2 | 5/2002 | Smeltzer et al. | |
| 6,395,848 B1 | 5/2002 | Morgan et al. | |
| 6,410,626 B1 | 6/2002 | Wada et al. | |
| 6,429,258 B1 | 8/2002 | Morgan et al. | |
| 6,436,244 B1 | 8/2002 | Fuhrer et al. | |
| 6,482,979 B1 | 11/2002 | Hintzer et al. | |
| 6,512,063 B2 | 1/2003 | Tang | |
| 6,518,442 B1 | 2/2003 | Felix et al. | |
| 6,576,703 B2 | 6/2003 | Kapeliouchko et al. | |
| 6,593,416 B2 | 7/2003 | Grootaert et al. | |
| 6,602,968 B1 | 8/2003 | Bekiarian et al. | |
| 6,610,788 B1 | 8/2003 | Takakura et al. | |
| 6,613,941 B1 | 9/2003 | Felix et al. | |
| 6,624,268 B1 | 9/2003 | Maekawa et al. | |
| 6,632,508 B1 | 10/2003 | Pellerite et al. | |
| 6,642,307 B1 | 11/2003 | Sogabe et al. | |
| 6,642,415 B1 | 11/2003 | Fuhrer et al. | |
| 6,660,798 B1 | 12/2003 | Marchese et al. | |
| 6,693,152 B2 | 2/2004 | Kaspar et al. | |
| 6,703,520 B2 | 3/2004 | Hintzer et al. | |
| 6,706,193 B1 | 3/2004 | Burkard et al. | |
| 6,710,123 B1 | 3/2004 | Amin-Sanayei et al. | |
| 6,737,489 B2 | 5/2004 | Linert et al. | |
| 6,750,304 B2 | 6/2004 | Kaspar et al. | |
| 6,761,964 B2 | 7/2004 | Tannenbaum | |
| 6,774,164 B2 | 8/2004 | Lyons et al. | |
| 6,794,550 B2 | 9/2004 | Hintzer et al. | |
| 6,815,040 B2 | 11/2004 | Pellerite et al. | |
| 6,822,059 B2 | 11/2004 | Buckanin et al. | |
| 6,825,250 B2 | 11/2004 | Epsch et al. | |
| 6,833,403 B1 | 12/2004 | Baldel et al. | |
| 6,846,570 B2 | 1/2005 | Leech et al. | |
| 6,861,466 B2 * | 3/2005 | Dadalas et al. | 524/544 |
| 6,861,490 B2 | 3/2005 | Kaspar et al. | |
| 6,869,997 B2 | 3/2005 | Wille et al. | |
| 6,878,772 B2 | 4/2005 | Visca et al. | |
| 6,972,094 B2 | 12/2005 | Ichida et al. | |
| 7,026,408 B2 | 4/2006 | Leech et al. | |
| 7,045,571 B2 | 5/2006 | Tan et al. | |
| 7,064,170 B2 | 6/2006 | Kaspar et al. | |
| 7,074,862 B2 | 7/2006 | Kaspar et al. | |
| 7,122,608 B1 | 10/2006 | Brinati et al. | |
| 7,125,941 B2 | 10/2006 | Kaulbach et al. | |
| 7,126,016 B2 | 10/2006 | Fu et al. | |
| 7,141,620 B2 | 11/2006 | Hoshikawa et al. | |
| 2002/0198345 A1 | 12/2002 | Grootaert et al. | |
| 2004/0010156 A1 | 1/2004 | Kondo et al. | |
| 2004/0116742 A1 | 6/2004 | Guerra | |
| 2004/0143052 A1 | 7/2004 | Epsch et al. | |
| 2004/0186219 A1 | 9/2004 | Dadalas et al. | |
| 2004/0242755 A1 | 12/2004 | Araki et al. | |
| 2005/0043471 A1 | 2/2005 | Epsch et al. | |
| 2005/0070633 A1 | 3/2005 | Epsch et al. | |
| 2005/0090601 A1 | 4/2005 | Dadalas et al. | |
| 2005/0090613 A1 | 4/2005 | Maruya et al. | |
| 2005/0107506 A1 * | 5/2005 | Kapeliouchko et al. | 524/379 |
| 2005/0113519 A1 | 5/2005 | Buckanin et al. | |
| 2005/0154104 A1 | 7/2005 | Malvasi et al. | |
| 2006/0003168 A1 | 1/2006 | Dadalas et al. | |
| 2006/0041051 A1 | 2/2006 | Nakatani et al. | |
| 2006/0160947 A1 | 7/2006 | Tan et al. | |
| 2006/0281946 A1 | 12/2006 | Morita et al. | |
| 2007/0082993 A1 * | 4/2007 | Amin-Sanayei et al. | 524/386 |

FOREIGN PATENT DOCUMENTS

| | | |
|---|---|---|
| DE | 3828063 | 2/1990 |
| EP | 0222945 | 11/1984 |
| EP | 0525660 | 2/1993 |
| EP | 0894541 | 2/1999 |
| EP | 0 890 592 B1 | 5/2003 |
| EP | 1 334 996 | 3/2004 |
| EP | 1 462 461 A1 | 9/2004 |
| GB | 642025 | 8/1950 |
| GB | 821353 | 10/1959 |
| JP | 46011031 | 8/1966 |
| JP | 2002-308914 | 10/2002 |
| JP | 2002-317003 | 10/2002 |
| JP | 2003-119204 | 4/2003 |
| JP | 2003-212919 | 7/2003 |
| JP | 2004-358397 | 12/2004 |
| JP | 2004-359870 | 12/2004 |
| JP | 2005-008775 | 1/2005 |
| JP | 2005-0105045 | 4/2005 |
| RU | 2158274 | 10/2000 |
| WO | WO96/24622 | 8/1996 |
| WO | WO02/20676 | 3/2002 |
| WO | WO 03/087176 | 10/2003 |
| WO | WO 03/087179 | 10/2003 |
| WO | WO 2005/003075 | 1/2005 |
| WO | WO2005/042593 | 5/2005 |
| WO | WO2005/056614 | 6/2005 |
| WO | WO2005/063827 | 7/2005 |
| WO | WO2005/065800 | 7/2005 |
| WO | WO2005/121290 | 12/2005 |
| WO | WO2006/011533 | 2/2006 |
| WO | WO2006/020721 | 2/2006 |
| WO | WO-2007/120348 A1 * | 10/2007 |

OTHER PUBLICATIONS

"High Performance Polymers for Diverse Applications," Modern Fluoropolymers, Edited by John Scheirs. John Wiley & Sons, 1997.

"Hydrogen-Ion Activity to Laminated Materials, Glass," Encyclopedia of Chemical Technology. John Wiley & Sons, vol. 13, 3$^{rd}$ Ed. 1981. (p. 687).

"Immobilized Biocatalysts to Isoprene," Ullmann's Encyclopedia of Industrial Chemistry. vol. A14. 1985. (p. 439-459).

"Identification to Lignin," Encyclopedia of Polymer Science and Engineering. John Wiley & Sons, vol. 8. 1987 (p. 347).

"Nonionic Surfactants." Edited by Martin J. Schick. 1967.

"Synthesis of Perfluoroalkyl Vinyl Ether Acids and Derivatives," Perfluoroalkyl Vinyl Ether Acids. Raymond Sullivan, vol. 34, No. 6, Jun. 1969. (p. 1841).

Storsberg, Joachim and Ritter, Helmut, "Cyclodextrins in Polymer Synthesis: A 'Green' Route to Fluorinated Polymers via Cyclodextrin Complexes in Aqueous Solution", *Macromol. Chem Phys.*, 2002, pp. 812-818.

Drobny, "Technology of Fluoropolymers," CRC Press LLC, 2001, p. 35.

\* cited by examiner

FLUOROPOLYMER DISPERSION AND METHOD FOR MAKING THE SAME

FIELD OF THE INVENTION

The present invention relates to aqueous fluoropolymer dispersions and methods for making partially fluorinated polymers.

BACKGROUND OF THE INVENTION

The aqueous emulsion polymerization of fluorinated monomers generally involves the use of a fluorinated surfactant. Fluorinated surfactants have recently become undesirable due to their bio-persistent nature. Thus the fluoropolymer manufacturing industry is seeking ways to address polymerization of fluoropolymers without the use of fluorinated surfactants.

SUMMARY OF THE INVENTION

An embodiment of the present method is directed to polymerizing, in an aqueous medium, at least one fluorinated monomer in the presence of a non-copolymerizable, non-fluorinated surfactant. The surfactant is generally selected from a non-ionic surfactant, a primary anionic surfactant, or a combination thereof. Fluorinated surfactants are not utilized in the polymerization process. The resulting partially fluorinated polymer, in an aqueous medium, is either a semi-crystalline polymer or a crystalline polymer.

DETAILED DESCRIPTION

One embodiment of the present invention is directed to a method for polymerizing, in an aqueous medium, at least one fluorinated monomer in the presence of a non-copolymerizable, non-fluorinated surfactant. The surfactant is generally selected from a non-ionic surfactant, a primary anionic surfactant, or a combination thereof. Fluorinated surfactants are not utilized in the present method. The partially fluorinated polymer resulting from the method is either a semi-crystalline polymer or a crystalline polymer with particles suitable in size to create a colloidal suspension in the aqueous medium.

The method of the preferred embodiment does not contain any fluorinated surfactant. For an extended period of time, fluorinated surfactants, such as PFOA and its salts, have been the primary surfactants utilized in fluoropolymer polymerization processes. The use of fluorinated surfactants was often preferred due to the general ease and ability to achieve the desired molecular weights for resulting polymers. However, it is generally recognized that fluorinated surfactants tend to be bio-persistent and therefore somewhat undesirable from an environmental standpoint. Thus the present embodiment is particularly directed to the discovery of specific surfactants that enable the polymerization of monomers with desired molecular weights but without the potentially undesirable environmental impact. More specifically, the resulting dispersion containing semi-crystalline or crystalline fluoropolymers are obtained with a non-ionic surfactant, a primary anionic surfactant, or a combination thereof, but without any fluorinated surfactant.

Crystalline or semi-crystalline fluoropolymers may often be referred to as fluorothermoplasts. Fluorothermoplasts are generally fluoropolymers that have a distinct and well noticeable melting point, typically in the range of 60 to 320° C. or between 80 and 310° C. They thus have a substantial crystalline phase.

The method is suitable for manufacturing fluoropolymers having at least one fluorinated monomer. Fluorinated monomers may be selected to achieve the desired partially fluorinated polymer. Thus either partially fluorinated monomers or perfluorinated monomers in combination with other partially fluorinated monomers or non-fluorinated monomers may be suitable for use with the present invention.

Partially fluorinated monomers are those possessing at least one hydrogen atom with at least one fluorine atom on the monomers carbon structure. Non-limiting examples include vinylidene fluoride and vinyl fluoride.

Optionally, perfluorinated monomers may be included with at least one partially fluorinated monomer or with non-fluorinated monomers. Perfluorinated, or fully fluorinated, monomers are those having fluorine atoms attached to the carbon structure with no hydrogen atoms present. Preferred perfluorinated monomers include tetrafluoroethylene and hexafluoropropylene. The preferred monomers may be incorporated into the polymerization reaction individually or in combination. When tetrafluoroethylene is utilized, it is preferred that the tetrafluoroethylene content not exceed seventy five weight percent of the monomer content in the reaction mixture, and most preferably no greater than fifty weight percent. Non-fluorinated monomers generally include ethylene and propylene. In one preferred aspect, tetrafluoroethylene is polymerized with ethylene to form a partially fluorinated polymer.

In a most preferred embodiment, the present method is utilized to make a copolymer using repeating units of vinylidene fluoride, tetrafluoroethylene, hexafluoropropylene, and optionally perfluoropropyl vinyl ether. In general, the monomer reaction component in the polymerization are included in the ranges of 10 mol % to 60 mol % vinylidene fluoride, 30 mol % to 80 mol % tetrafluoroethylene, 5 mol % to 20 mol % hexafluoropropylene, and 0 mol % to 2 mol % perfluoropropyl vinyl ether.

The surfactant utilized in the polymerization reaction is generally selected from a non-ionic surfactant, a primary anionic surfactant, or a combination thereof. The surfactants are generally non-copolymerizable meaning that they do not become part of the polymeric chain during the reaction. Further, the surfactants are also non-fluorinated and thus contain no fluorine atoms. Typically, the non-ionic surfactant is a surfactant that contains one or more saturated or unsaturated aliphatic and/or aromatic moieties linked to one or more non-ionic hydrophilic groups. The saturated or unsaturated aliphatic moieties may include linear, branched and/or cyclic structures and they can be linked to the non-ionic hydrophilic group through a functional group such as an ester, ether linkage, amide linkage etc. The non-ionic hydrophilic group generally comprises oxyalkylene groups in which the alkylene group has 2, 3 or 4 carbon atoms. For example, the non-ionic hydrophilic group may be a polyoxyethylene group, a polyoxypropylene group or a copolymer, including block-copolymers, comprising oxyethylene and oxypropylene groups.

Non-limiting examples of non-ionic surfactants include for example, polyoxyethylene alkyl phenols, polyoxyethylene alcohols, polyoxyethylene esters, polyoxyethylene mercaptans, polyoxyethylene alkylamides, polyoxyethylene alkalamides, polyols, polyalkylene oxide block copolymers, fatty alkanol amides, amine oxides, sulfoxides, phosphine oxides, acetylenic glycols, polyoxyethylene, and combinations thereof. In accordance with the present invention, the surfactants suitable for use in the present method specifically exclude siloxanes or silicone surfactants.

Preferably a primary anionic surfactant is utilized. Primary anionic surfactants are typically defined by the following formulas:

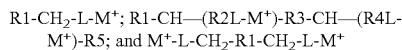

R1-CH$_2$-L-M$^+$; R1-CH—(R2L-M$^+$)-R3-CH—(R4L-M$^+$)-R5; and M$^+$-L-CH$_2$-R1-CH$_2$-L-M$^+$ wherein R1 to R5 can be an aromatic, alkyl, or alkenyl group, L is one of —COO$^-$, PO$_3^-$, —OPO$_3^-$, —SO$_3^-$, or —OSO$_3^-$, and M$^+$ is a monovalent cation. A preferred primary anionic surfactant are those corresponding to salts of lauric acid. Salts of lauric acid may be particularly described by the formula: R1-CH2-L-M$^+$; wherein R1 can be an alkyl or alkenyl group, L is —COO$^-$ and M$^+$ is a monovalent cation. Specific examples of salts of lauric acid include ammonium or sodium salts of Edenor C12 (Henkel KGa).

The amount of non-ionic surfactant, primary anionic surfactant or both added to the polymerization media will generally depend on the nature of the selected surfactant and the nature and amount of the monomers selected for polymerization. Typically, the amount of primary anionic surfactant will be between 10 ppm and 5000 ppm, preferably between 30 ppm and 3000 ppm, more preferably between 50 ppm and 2500 ppm based on the weight of the fluoropolymer solids in the dispersion. The optimal concentration of the primary anionic surfactant in the dispersion can be easily determined by one skilled in the art through routine experimentation.

The polymerization of the monomers is started in the presence of the surfactant according to the present invention, i.e. the polymerization is initiated in the presence of the surfactant. As previously noted, the amount of surfactant used may vary depending on desired properties such as amount of solids, particle size etc. The surfactant can either be added before the polymerization starts as a whole, or part of it can be added during the polymerization.

In a particular embodiment, the desired surfactant or surfactants are used in the aqueous emulsion polymerization of one or more fluorinated monomers, in particular gaseous fluorinated monomers. By gaseous fluorinated monomers is meant monomers that are present as a gas under the polymerization conditions.

It may be desirable to add certain monomer to the polymerization in the form of an aqueous emulsion. For example, fluorinated monomers and in particular perfluorinated co-monomers that are liquid under the polymerization conditions may be advantageously added in the form of an aqueous emulsion. Such emulsion of such co-monomers is preferably prepared using the surfactant as an emulsifier.

The aqueous emulsion polymerization may be carried out at a temperatures between 10 to 100° C., preferably 30° C. to 80° C. and the pressure is typically between 2 and 30 bar, in particular 5 to 20 bar. The reaction temperature may be varied during the polymerization to influence the molecular weight distribution, i.e., to obtain a broad molecular weight distribution or to obtain a bimodal or multimodal molecular weight distribution.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic include for example ammonium-alkali- or earth alkali salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit®) or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added. The amount of initiator may be between 0.01% by weight (based on the fluoropolymer solids to be produced) and 5% by weight. In one embodiment, the amount of initiator is between 0.05 and 3% by weight. In another embodiment, the amount may be between 0.1 and 2% by weight.

The aqueous emulsion polymerization system may further comprise other materials, such as buffers and, if desired, complex-formers or chain-transfer agents. Examples of chain transfer agents that can be used include ether e.g. dimethyl ether, methyl t-butyl ether, alkanes having 1 to 5 carbon atoms such as ethane, propane and n-pentane, esters such as diethyl malonic ester, halogenated hydrocarbons such as CCl$_4$, CHCl$_3$ and CH$_2$Cl$_2$ and hydrofluorocarbon compounds such as CH$_2$F—CF$_3$ (R134a).

The aqueous emulsion polymerization results in a dispersion of the fluoropolymer in water. Generally the amount of solids of the fluoropolymer in the dispersion directly resulting from the polymerization will vary between 3% by weight and about 40% by weight depending on the polymerization conditions. A typical range is between 5 and 35% by weight, for example between 10 and 30% by weight. The particle size (volume average diameter) of the fluoropolymer is typically between 40 nm and 400 nm with a typical particle size being between 60 nm and about 350 nm.

For coating applications, an aqueous dispersion of the fluoropolymer is desired and hence the fluoropolymer will not need to be separated or coagulated from the dispersion. To obtain a fluoropolymer dispersion suitable for use in coating applications such as for example in the impregnation of fabrics or in the coating of metal substrates to make for example cookware, it will generally be desired to add further stabilizing surfactants, increase the fluoropolymer solids or both.

The amount of fluoropolymer solids in the dispersion may be upconcentrated as needed or desired to an amount between 30 and 70% by weight. For this purpose, preferably further stabilizing compounds such as nonionic surfactants may be post-added. Any of the known upconcentration techniques may be used including ultrafiltration and thermal upconcentration.

The invention will now be further illustrated with reference to the following examples, without however the intention to limit the invention thereto.

EXAMPLES

The physical characteristics of the resulting polymer were determined through the following procedures:

1. Solid Content
   Determination of solid content was carried out subjecting the sample to a temperature up to 250° C. for 30 min.
2. Particle Size
   Particle size was measured via inelastic light scattering using the Malvern 1000 HAS Zetasizer.
3. Melt Flow Index (MFI)
   The melt flow index (MFI), reported in g/10 min, was measured according to DIN 53735, ISO 12086 or ASTM D-1238 at a support weight of 5.0 kg. Unless otherwise noted, a temperature of 265° C. was applied and a standardized extrusion die of 2.1 mm diameter and a length of 8.0 mm was used.

Example 1

A vertically disposed, stirred and heating/cooling jacketed cylindrical stainless-steel reactor, having a capacity of 52 l, was charged with 30 l demineralized water, 15 g NaOH in 1985 g water and 2 grams lauric acid dispersing agent. The kettle was evacuated and pressurized to 4 bar abs with nitrogen four times. The reactor was purged with TFE to remove traces of oxygen and nitrogen. After heating of the reactor to 70° C., it was pressurized with 0.8 bar abs ethane, 1.9 bar abs VDF, 8.6 bar abs HFP and 3.7 bar abs TFE. After reaching a total pressure of 15.5 bar abs a solution of 18 g ammoniumpersulfate in 200 ml water was pumped in the kettle. Stirring speed was set at 240 rpm. The pressure was kept constant by feeding TFE/HFP and VDF in a constant ratio of 1:0.412/0.488. During polymerization 1 l of a solution of 1 g/l lauric acid was continuously fed to the reactor. After about 2400 grams TFE have been fed to the kettle the reaction was stopped by closing the monomer dosing valve. The reactor was vented and the polymer dispersion (solids 14%) discharged.

The resulting polymer had the following properties: Particle size of about 169 nm, melting point of 140° C. and a melt flow index (265° C./5 kg) of 180.

Example 2

A vertically disposed, stirred and heating/cooling jacketed cylindrical stainless-steel reactor, having a capacity of 52 l, was charged with 30 l demineralized water 15 g NaOH in 1985 g water and 0.3 g Genapol X-080 (Clariant GmbH, Sulzbach, Germany) dispersing agent. The kettle was evacuated and pressurized to 4 bar abs with nitrogen four times. The reactor was purged with TFE to remove traces of oxygen and nitrogen. After heating of the reactor to 70° C., it was pressurized with 0.8 bar abs ethane, 1.9 bar abs VDF, 8.6 bar abs HFP and 3.7 bar abs TFE. After reaching a total pressure of 15.5 bar abs a solution of 9.0 g ammoniumpersulfate in 200 ml water was pumped in the kettle, to start the reaction. Stirring speed was set at about 240 rpm. The pressure was kept constant by feeding TFE/HFP and VDF in a constant ratio of 1:0.412/0.488. After about 3400 grams TFE have been fed to the kettle, the reaction was stopped by closing the monomer dosing valve. The reactor was vented and the polymer dispersion (solids 19%) discharged.

The resulting polymer has the following properties: Particle size of about 170 nm, melting point of 142° C. and a melt flow index (265° C./5 kg) of 80 g/10 min

Example 3

A vertically disposed, stirred and heating/cooling jacketed cylindrical stainless-steel reactor, having a capacity of 52 l, was charged with 30 l demineralized water 15 g NaOH in 1985 g water and 0.3 g Hostaphat OPS 100 dispersing agent from (Clariant GmbH, Sulzbach, Germany). The kettle was evacuated and pressurized to 4 bar abs with nitrogen four times. The reactor was purged with TFE to remove traces of oxygen and nitrogen. After heating of the reactor to 70° C., it was pressurized with 0.8 bar abs ethane, 1.9 bar abs VDF, 8.6 bar abs HFP and 3.7 bar abs TFE. After reaching a total pressure of 15.5 bar abs a solution of 9 g ammoniumpersulfate in 200 ml water was pumped in the kettle, to start the reaction. Stirring speed was set at about 240 rpm. The pressure was kept constant by feeding TFE/HFP and VDF in a constant ratio of 1:0.412/0.488. After about 2400 grams TFE have been fed to the kettle the reaction was stopped by closing the monomer dosing valve. The reactor was then vented and the polymer dispersion (solids 13%) discharged.

The resulting polymer has the following properties: Particle size of about 275 nm, melting point of 144° C. and a melt flow index (265° C./5 kg) of 63 g/10 min.

What is claimed is:

1. A method comprising polymerizing in an aqueous medium at least one fluorinated monomer in the presence of a non-copolymerizable, non-fluorinated surfactant, the surfactant selected from:
   (i) a non-ionic surfactant selected from, polyoxyethylene mercaptans, polyoxyethylene alkylamides, polyoxyethylene alkalamides, polyalkylene oxide block copolymers, fatty alkanol amides, amine oxides, sulfoxides, phosphine oxides, acetylenic glycols, and combinations thereof, or
   (ii) a non-ionic surfactant selected from polyoxyethylene mercaptans, polyoxyethylene alkylamides, polyoxyethylene alkalamides, polyalkylene oxide block copolymers, fatty alkanol amides, amine oxides, sulfoxides, phosphine oxides, acetylenic glycols, and combinations thereof, and a surfactant according to the formulas $R1\text{-}CH_2\text{-}L^-M^+$, $R1\text{-}CH\text{—}(R2L^-M^+)\text{-}R3\text{-}CH\text{—}(R4L^-M^+)\text{-}R5$ or $M^{+-}L\text{-}CH_2\text{—}R1\text{-}CH_2\text{-}L^-M^{+-}$; wherein R1 to R5 can be an aromatic, alkyl, or alkenyl group, L is one of $-COO^-$, $PO_3^-$, $-OPO_3^-$, $-SO_3^-$, or $-OSO_3^-$, and $M^+$ is a monovalent cation;

and wherein the polymerization is carried out in the absence of a fluorinated surfactant and the resulting polymer is a partially fluorinated polymer having a semicrystalline or crystalline structure.

2. The method of claim 1, wherein the at least one fluorinated monomer is a partially fluorinated monomer selected from vinylidene fluoride or vinyl fluoride.

3. The method of claim 2, further comprising tetrafluoroethylene, hexafluoropropylene, or combinations thereof.

4. The method of claim 3, wherein the weight percent of tetrafluoroethylene in the resulting polymer is no greater than 75.

5. The method of claim 1, wherein the non-fluorinated surfactant is a salt of lauric acid.

6. The method of claim 1, wherein the surfactant is included in an amount of about 10 ppm to about 5000 ppm based upon the amount of partially fluorinated semi-crystalline or crystalline polymer in the dispersion.

7. The method of claim 1, further comprising a non-fluorinated monomer selected from ethylene and propylene.

8. The method of claim 1, wherein the resulting fluorinated polymer is derived from tetrafluoro ethylene and ethylene.

9. The method of claim 1, wherein the resulting fluoropolymer has a particle size below 400 nm.

* * * * *

UNITED STATES PATENT AND TRADEMARK OFFICE
CERTIFICATE OF CORRECTION

PATENT NO. : 7,728,087 B2  Page 1 of 1
APPLICATION NO. : 11/275331
DATED : June 1, 2010
INVENTOR(S) : Klaus Hintzer It is certified that error appears in the above-identified patent and that said Letters Patent is hereby corrected as shown below:

Column 5
Line 67, after "min" insert -- . --.

Column 6
Line 30, in Claim 1, delete "from," and insert in place thereof -- from --.

Line 43, in Claim 1, delete "$M^{+-}L\text{-}CH_2\text{—}R1\text{-}CH_2\text{-}L^-M^{+-}$;" and insert in place thereof -- $M^{+-}L\text{-}CH_2\text{—}R1\text{-}CH_2\text{-}L^-M^+$; --.

Column 7
Line 4, in Claims 8, delete "tetrafluoro ethylene" and insert in place thereof -- tetrafluoroethylene --.

Signed and Sealed this

Twenty-sixth Day of October, 2010

David J. Kappos
*Director of the United States Patent and Trademark Office*